C. A. REEVES.
LAND CLEARING AND DIGGING MACHINE.
APPLICATION FILED MAR. 21, 1910.
987,016.
Patented Mar. 14, 1911.
2 SHEETS—SHEET 1.
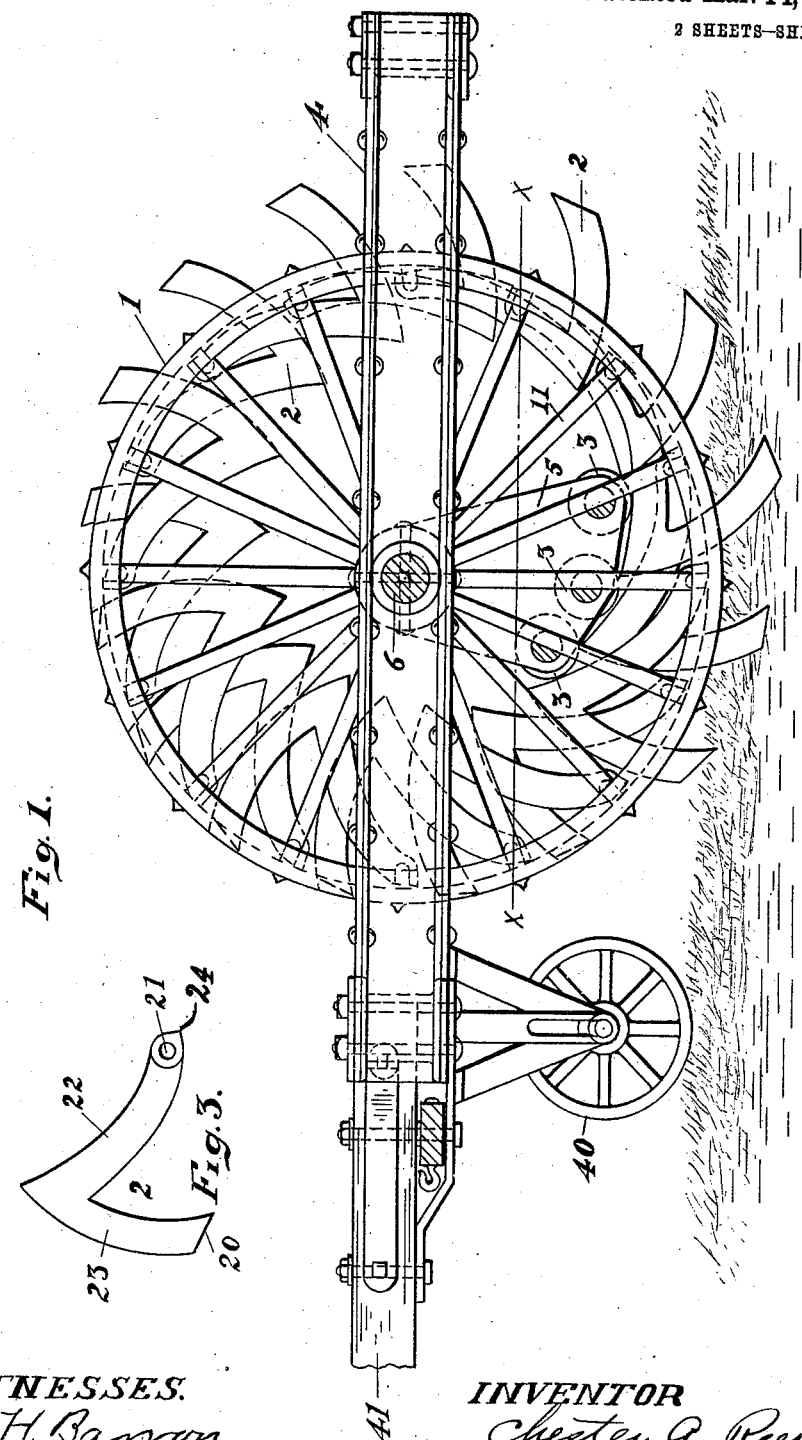
WITNESSES.
F. H. Barron
Gordon E. MacMillan
INVENTOR
Chester A. Reeves
BY Henry L. Reynolds.
ATTORNEY.

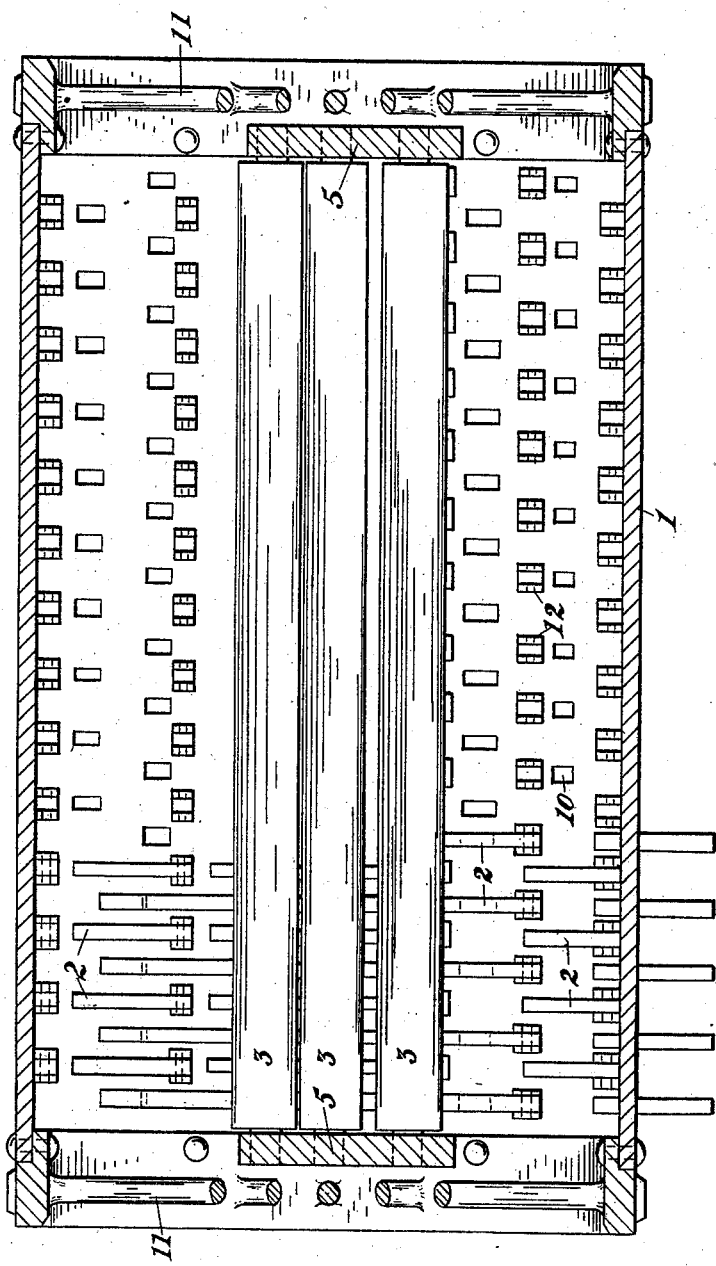

UNITED STATES PATENT OFFICE.

CHESTER A. REEVES, OF LAIDLAW, OREGON.

LAND CLEARING AND DIGGING MACHINE.

987,016.  Specification of Letters Patent.  Patented Mar. 14, 1911.

Application filed March 21, 1910. Serial No. 550,769.

*To all whom it may concern:*

Be it known that I, CHESTER A. REEVES, a citizen of the United States, residing at Laidlaw, county of Crook, Oregon, have invented certain new and useful Improvements in Land Clearing and Digging Machines, of which the following is a specification.

My invention relates to an improvement in land clearing and digging machines, and comprises the novel parts and combination of parts which will be hereinafter described and particularly pointed out in the claims.

One object of my invention is to provide a machine which shall stir up or loosen the soil surface and do this in such a way as will not invert the soil layers or destroy the capillary connection between the surface layers and the subsoil.

Another object is to do this work by such means and in such manner that it may be done upon land having a growth of small bushes, weeds, shrubs, grass and such small vegetation, without prior clearing of this growth being necessary, and also in such a way that much of this growth may be loosened or torn up so that it will die and may be easily removed.

My invention comprises the novel parts and combinations of parts which will be particularly pointed out in the claims.

In the drawings I have shown a preferred form of my device.

Figure 1 is an elevation of my device taken from one side. Fig. 2 is a sectional plan of my device taken on line $x$, $x$ of Fig. 1, with however, some of the parts removed. Fig. 3 is a side view of one of the digging spades.

I have designed my machine particularly for use under the conditions obtaining in the semi-arid or sage brush lands of the west. On these lands the soil is usually loose and friable and in its natural or unreclaimed condition is covered with sage brush, grease wood, bunch grass or like growth. None of this growth is of such character that it offers serious resistance to driving over it with such an implement as a roller, if of reasonable diameter. The sage brush and grease wood is usually not very large, the average height usually being three feet or less. Moreover, the stalks or stems of such growth are usually brittle or badly shattered or cracked so that they offer but slight resistance to bending down. Their roots also are neither large nor very firmly rooted in the ground. It is with a knowledge of these conditions that I have designed my present invention.

The characteristic features of my invention consists,—1st, of a cylindrical shell resembling a roller, having numerous holes; 2nd, of mattock-like digging hoes or spades which are pivoted at one end within and to the shell, their other ends being projectable through the holes in the shell; 3rd, in rollers fixedly journaled within the shell and adapted to engage and force the spades outward while they are passing through the lower part of their circular path.

The shell 1 is of iron and has spokes 11 connecting its ends with a central shaft 6. This central shaft 6 is secured to the frame 4 so as to be incapable of turning. The shell 1 has numerous holes 10 through which the digging ends 23 of the hoes or spades 2 may be projected. One of these spades is shown alone in Fig. 3. These are made of steel having a width in the plane shown in Figs. 1 and 3, of from two to four times their thickness in the direction of the length of the shaft 6. These hoes or spades consist of two curved arms, the digging arm 23 which projects through the holes in the shell, and the pivot arm 22 which is at all times within the shell and is engaged by the rollers 3 to force the digging arm outward. The digging arm 23 is curved to the segment of a circle of which the pivot point 21 is the center, whereby they will be guided to reciprocate through the holes in the drum 66. The free end of the inner arm 22 is provided with a pivot hole 21 by which it is pivoted between lugs 12 projecting from the shell. The pivots for these arms are located close to the periphery of the drum and the pivot end of each arm terminates in a slight projection 24 which is adapted to engage the shell of the drum and limit the inward movement of the arm to a point such that the point 20 of the digging arm has not entirely cleared the hole in the shell of the drum. The pivot arms 22 are preferably curved, their concave edges being toward the shaft 6, so as to approximate the curve of the drum. The inner surfaces of the arms 22 as they reach the lower part of their circular path in turning with the shell or drum 1, are engaged by the fixed rollers 3, which are journaled in the brackets 5 fixedly secured to the non-rotative shaft 6. The inner curved surfaces of the arms 22 and the rollers 3, act as cams and cam rollers to force the digging half 23 outward, through the holes 10 in the shell or drum, and the weight of the machine forces them into the ground. The digging points 20 should be kept sharpened so that they will enter the ground without too much resistance. By reason of their curved form, the location of their pivots and the location of the rollers 3, these points are forced into the ground endwise, which minimizes the resistance, and are lifted out of the ground in very nearly a horizontal position. As these digging spades are placed as closely together as possible, the ground is quite well loosened up and the brush and like vegetable growth is either lifted out of the ground or its roots are so disturbed that it may be easily pulled out. Also the disturbance of the root growth is such that death of the plant is likely under the rainless conditions which generally prevail.

I have shown a frame work 4 surrounding the drum 1, to which a tongue may be attached at 41. If desired a wheel or wheels 40 may be placed under this frame to take the weight of the tongue from the horses.

This method of treating the soil does not turn under the trash and does not destroy the capillary connection between the surface soil and the subsoil. As a result the surface does not dry out to the same extent as it would if plowed by a stirring plow which inverted the soil with the trash beneath. This is an important consideration in semi-arid sections. Also the brush and trash being left on the surface may be gathered and burned if desired. Being left on the surface this trash forms a protection against the soil-drifting and blowing action of the wind.

After the spades are lifted out of the ground by the turning of the drum, the action of gravity will cause them to swing so as to draw the digging arms within the drum. The action of the rollers 3 upon the spades forces them backward and into the ground even after the center of the drum has passed a given point. Being close together lengthwise the drum with the spades of successive rows in staggered position, there will be but little chance for any vegetation not being well loosened.

What I claim and desire to patent is:

1. In a machine of the character described, in combination, a rolling drum having a series of holes in its shell, a series of digging spades, each comprising a pivot arm having a pivot at one end and a digging arm integral with the pivot arm and extending from its free or swinging end as a segment of a circle of which the pivot is the center, said arms being pivoted to and within the drum in position to have their digging arms projected from the holes in the drum, and means for forcing said digging arms outward as they come to the lower part of the drum.

2. In a machine of the character described, in combination, a rolling drum having a series of holes in its shell, of a series of digging spades, each comprising a pivot arm having a pivot at one end and a digging arm integral with the pivot arm and extending from its free or swinging end as a segment of a circle of which the pivot is the center, said arms being pivoted to and within the drum in position to have their digging arms projected through the holes in the drum, and a fixed cam member engaging said arms to force the digging arms outward as they reach the bottom of the drum.

3. In a machine of the character described, in combination, a rolling drum having a series of holes in its shell, a series of digging members, each consisting of a circular-segmental digging arm and an integral pivot arm the pivot of which is the center of curvature of the segmental arm, the digging arm being thin in an axial direction as compared to its dimension in a radial direction, and means for forcing said digging arms outward as they reach the lower part of the drum.

4. In a machine of the character described, in combination, a rolling drum having a series of holes in its shell, a series of digging members, each consisting of a circular-segmental digging arm and an integral pivot arm, the pivot of which is the center of curvature of the segmental arm, and a series of cam rollers fixedly supported to successively engage said pivot arms to force the digging arms without the drum while passing about the lower part of the drum.

5. In a machine of the character described, in combination, a rolling drum having a series of holes in its shell for digging arms, and also having pivot lugs for said arms, a series of digging members each consisting of a circular-segmental digging arm and an integral pivot arm the pivot of which is the center of curvature of the segmental arm, the pivot end of said arm having a stop projection adapted to engage the shell of the drum and prevent inward withdrawal of the segmental arm beyond a determined point, and means for engaging said pivot arms to force the digging arms outward at the lower part of the drum.

In testimony whereof, I have hereunto affixed my signature this 25th day of February, 1910.

CHESTER A. REEVES.

Witnesses:
G. A. SPENCER,
H. L. REYNOLDS.

Copies of this patent may be obtained for five cents each, by addressing the "Commissioner of Patents, Washington, D. C."